US010745002B2

(12) United States Patent
Miller et al.

(10) Patent No.: US 10,745,002 B2
(45) Date of Patent: Aug. 18, 2020

(54) AUTONOMOUSLY GUIDING A VEHICLE TO A DESIRED PARKING LOCATION SELECTED WITH A REMOTE DEVICE

(71) Applicant: Robert Bosch GmbH, Stuttgart (DE)

(72) Inventors: James Stephen Miller, Dexter, MI (US); Sergio Andrés Amaya Correa, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/237,539

(22) Filed: Dec. 31, 2018

(65) Prior Publication Data

US 2020/0207333 A1  Jul. 2, 2020

(51) Int. Cl.
*B60W 30/06* (2006.01)
*G01C 21/36* (2006.01)
*G08G 1/14* (2006.01)

(52) U.S. Cl.
CPC ......... *B60W 30/06* (2013.01); *G01C 21/3602* (2013.01); *G01C 21/3623* (2013.01); *G08G 1/144* (2013.01)

(58) Field of Classification Search
CPC ............... B60W 30/06; G01C 21/3602; G01C 21/3623; G08G 1/144
See application file for complete search history.

(56) References Cited

U.S. PATENT DOCUMENTS

| 9,778,341 | B2 | 10/2017 | Banerjee et al. |
| 2016/0272244 | A1* | 9/2016 | Imai ....................... G08G 1/166 |
| 2016/0371983 | A1 | 12/2016 | Ronning et al. |
| 2017/0132482 | A1* | 5/2017 | Kim ....................... G06F 3/0486 |
| 2017/0253237 | A1* | 9/2017 | Diessner ............... B60W 10/04 |
| 2018/0024559 | A1 | 1/2018 | Seo et al. |
| 2018/0029591 | A1 | 2/2018 | Lavoie |
| 2018/0157267 | A1* | 6/2018 | Gao ....................... B62D 15/027 |
| 2018/0162384 | A1 | 6/2018 | Kim |
| 2018/0357906 | A1* | 12/2018 | Yaldo .................. B62D 15/0285 |
| 2018/0364737 | A1* | 12/2018 | Lavoie .................. B60W 30/06 |
| 2019/0220001 | A1* | 7/2019 | Lavoie ............... B62D 15/0285 |

* cited by examiner

*Primary Examiner* — Sisay Yacob
(74) *Attorney, Agent, or Firm* — Michael Best & Friedrich LLP

(57) ABSTRACT

A vehicle for autonomously parking in a desired parking location selected via a remote device. The vehicle includes a first camera, a vehicle control system, and a first electronic processor. The first electronic processor is configured to receive a first image from the first camera, determine a plurality of features in the first image, and receive, from the remote device, a second image and the desired parking location in the second image. The first electronic processor is also configured to determine a plurality of features in the second image, match the determined features in the second image to determined features in the first image, and determine a location of the vehicle relative to the desired parking location. The first electronic processor is further configured to determine a route to the desired parking location from a current location of the vehicle and autonomously maneuver the vehicle to the desired parking location.

20 Claims, 12 Drawing Sheets

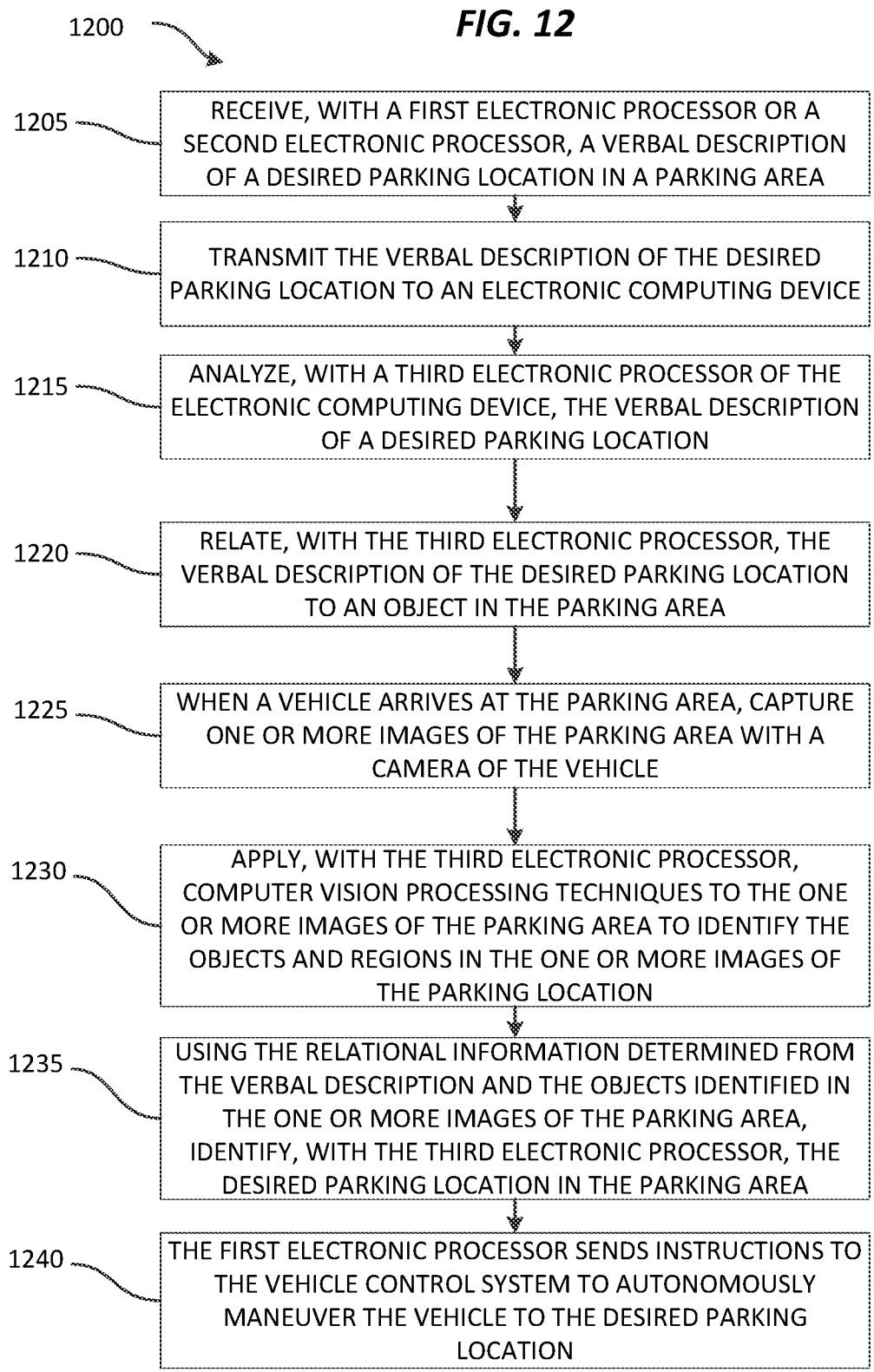

AUTONOMOUSLY GUIDING A VEHICLE TO A DESIRED PARKING LOCATION SELECTED WITH A REMOTE DEVICE

FIELD

Embodiments relate to automated parking for vehicles.

BACKGROUND

Modern vehicles include various partially autonomous driving functions, for example adaptive cruise-control, collision avoidance systems, self-parking, and the like. Fully autonomous driving is a goal, but has not yet been achieved, at least on market-ready, commercially-viable scale.

SUMMARY

One aspect of automated control for vehicles is self-parking. Some modern vehicles are able to self-park in locations defined by parking lines or by other vehicles. For example, some vehicles are capable of performing a parallel-parking maneuver. This kind of self-parking is useful because many drivers find parallel-parking difficult to perform manually. However, most self-parking maneuvers must be performed while the driver is in the driver's seat. In some situations, it may be desirable for a user (or driver) to park a vehicle when the user is not in the vehicle. In one example, the user may not be able to determine if a parking location is suitable from the interior of the vehicle due to obstructions in visibility, such as pillars in the vehicle, trees, other vehicles, and other objects. Therefore, it is desirable for the user to select the parking space from outside of the vehicle. In another example, if a user wishes to park a vehicle in a narrow space, it may be desirable for the user to get out of the vehicle before the vehicle moves into the parking space. Embodiments described herein provide, among other things, mechanisms to allow a user to select a parking space from outside the vehicle and command the vehicle to move into the parking space autonomously (i.e., without the driver controlling steering, braking, and acceleration using controls (for example, a steering wheel, brake pedal, and gas pedal) located inside the vehicle).

Embodiments provide, among other things, a vehicle and a method for parking a vehicle in a location that is not defined by parking lines or by surrounding vehicles. One embodiment provides a vehicle for autonomously parking in a desired parking location selected via a remote device. The vehicle includes a first camera, a vehicle control system, and a first electronic processor. The first electronic processor is configured to receive a first image from the first camera, determine a plurality of features in the first image, and receive, from the remote device, a second image and the desired parking location in the second image. The first electronic processor is also configured to determine a plurality of features in the second image, match the determined features in the second image to determined features in the first image, and determine a location of the vehicle relative to the desired parking location using the matched features. The first electronic processor is further configured to determine, using the location of the desired parking location relative to the location of the vehicle, a route to the desired parking location from a current location of the vehicle and autonomously maneuver, using the vehicle control system, the vehicle to the desired parking location.

Another embodiment provides a method of autonomously controlling a vehicle to move to a desired parking location selected via a remote device. The method includes receiving, with a first electronic processor, a first image from a first camera included in the vehicle, determining, with the first electronic processor, a plurality of features in the first image, and receiving, from the remote device, a second image and the desired parking location in the second image. The method also includes determining, with the first electronic processor, a plurality of features in the second image, matching, with the first electronic processor, the determined features in the second image to determined features in the first image, and determining, with the first electronic processor, a location of the desired parking location relative to the vehicle using the matched features. The method further includes determining, with the first electronic processor, using the location of the desired parking location relative to the vehicle, a route to the desired parking location from a current location of the vehicle and autonomously maneuvering, with a vehicle control system, the vehicle to the desired parking location.

Yet another embodiment provides a method of controlling motion of a vehicle using a remote device. The method includes receiving, with a first electronic processor of the vehicle, an image from a first camera of the vehicle and sending the image to the remote device. The method also includes receiving, with the first electronic processor, from the remote device a plurality of vehicular motion parameters based on the image and controlling movement of the vehicle based on the plurality of vehicular motion parameters.

Yet another embodiment provides a method of specifying a desired parking location for a vehicle using a verbal description. The method includes receiving, with a first electronic processor or a second electronic processor, the verbal description of the desired parking location in a parking area, transmitting, the verbal description of the desired parking location to an electronic computing device, and analyzing, with a third electronic processor of the electronic computing device, the verbal description of a desired parking location. The method also includes relating, with the third electronic processor, the verbal description of the desired parking location to an object in the parking area, when the vehicle arrives at the parking area, capturing one or more images of the parking area with a camera of the vehicle, and applying, with the third electronic processor, computer vision processing techniques to the one or more images of the parking area to identify objects and regions in the one or more images of the general location. The method further includes using the relational information determined from the verbal description and the objects identified in the one or more images of the parking area, identifying, with the third electronic processor, the desired parking location in the parking area, and sending, with the first electronic processor, instructions to a vehicle control system to autonomously maneuver the vehicle to the desired parking location.

Other aspects, features, and embodiments will become apparent by consideration of the detailed description and accompanying drawings.

BRIEF DESCRIPTION OF THE DRAWINGS

FIG. 12 is a flowchart of a method of specifying a desired parking location for a vehicle using a verbal description according to one embodiment.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
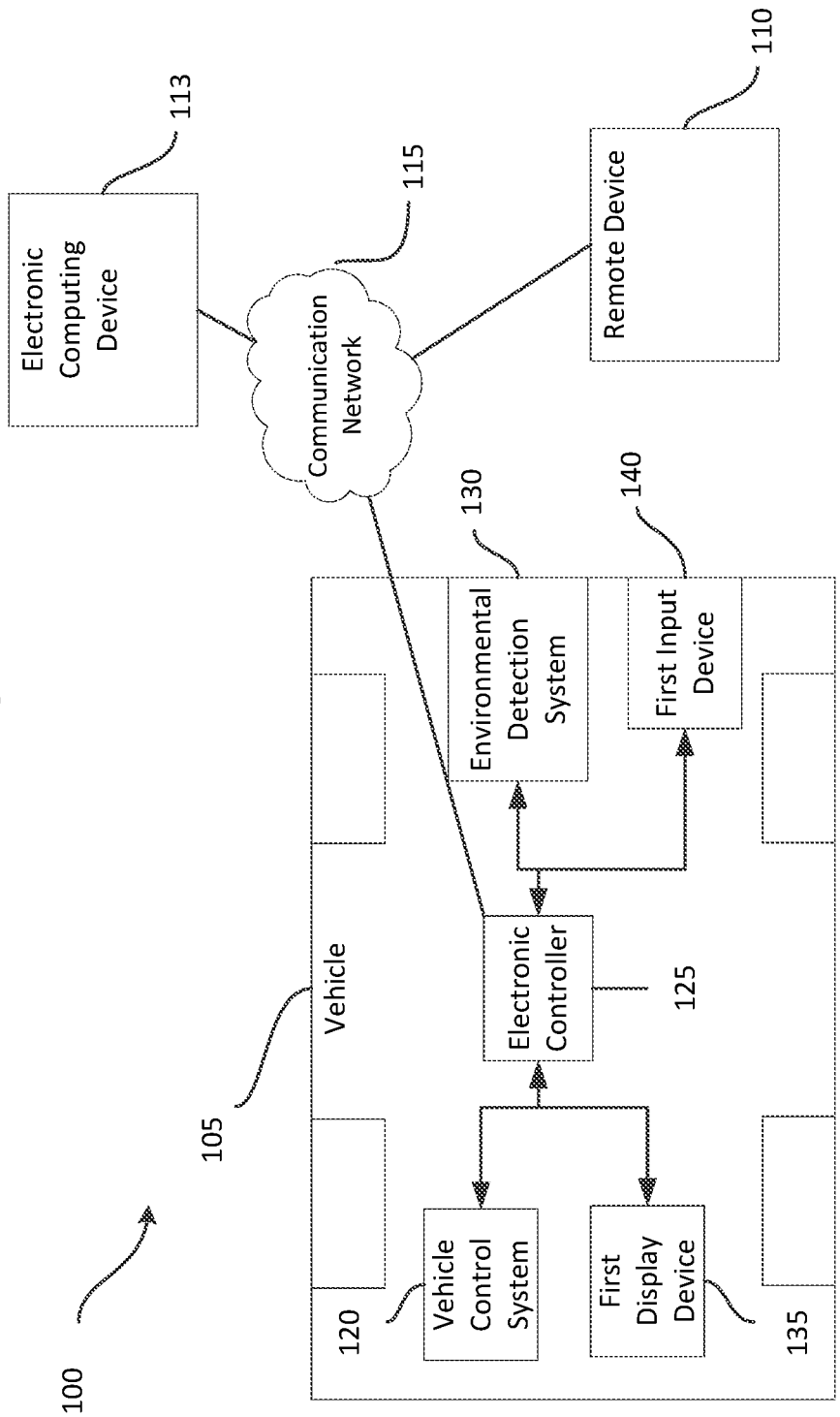
FIG. 1 is a block diagram of a system for autonomously controlling a vehicle to move to a desired parking location selected via a remote device according to one embodiment.

FIG. 1 illustrates a system 100 for autonomously controlling a vehicle to move to a desired parking location selected via a remote device. The system 100 includes a vehicle 105, a remote device 110, and an electronic computing device 113. The vehicle 105, remote device 110, and electronic computing device 113 communicate over one or more wired or wireless communication networks 115. Portions of the wireless communication networks 115 may be implemented using a wide area network, such as the Internet, a local area network, such as a Wi-Fi network, short-range wireless networks, such as a Bluetooth™ network, near field communication connections, and combinations or derivatives thereof. It should be noted that while certain functionality described herein as being performed by one component of the system 100, in some embodiments that functionality may be performed by a different component of the system 100 or a combination of components of the system 100. It should be understood that the system 100 may include any number of electronic computing devices and the single electronic computing device 113 illustrated in FIG. 1 is purely for illustrative purposes.

The vehicle 105, although illustrated as a four-wheeled vehicle, may encompass various types and designs of vehicles. For example, the vehicle 105 may be an automobile, a motorcycle, a truck, a bus, a semi-tractor, and others. The vehicle 105 includes at least some autonomous functionality, but may also require a driver or operator to perform driving functions. In the example illustrated, the vehicle 105 includes several hardware components including a vehicle control system 120, an electronic controller 125, an environment detection system 130, a first display device 135, and a first input device 140. The first display device 135 may be, for example, a touchscreen, a liquid crystal display ("LCD"), a light-emitting diode ("LED") display, an organic LED ("OLED") display, an electroluminescent display ("ELD"), and the like. The first input device 140 may be, for example, a keypad, a mouse, a touchscreen (for example, as part of the first display device 135), a microphone, a camera, or the like. The vehicle control system 120, electronic controller 125, and environment detection system 130 will be described in further detail below. The components of the vehicle 105 may be of various constructions and may use various communication types and protocols.

The electronic controller 125 may be communicatively connected to the vehicle control system 120, environment detection system 130, first display device 135, and first input device 140 via various wired or wireless connections. For example, in some embodiments, the electronic controller 125 is directly coupled via a dedicated wire to each of the above-listed components of the vehicle 105. In other embodiments, the electronic controller 125 is communicatively coupled to one or more of the components via a shared communication link such as a vehicle communication bus (for example, a controller area network (CAN) bus) or a wireless connection. It should be understood that each of the components of the vehicle 105 may communicate with the electronic controller 125 using various communication protocols. The embodiment illustrated in FIG. 1 provides but one example of the components and connections of the vehicle 105. However, these components and connections may be constructed in other ways than those illustrated and described herein.

Figure 2:
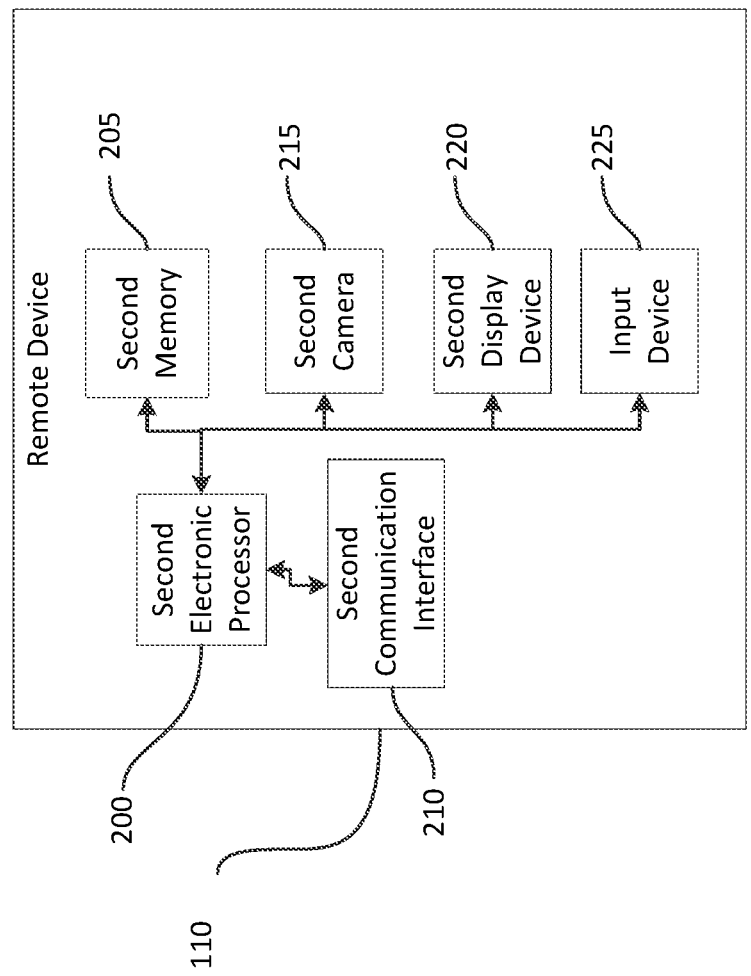
FIG. 2 is a block diagram of a remote device of the system of FIG. 1 according to one embodiment.

The remote device 110 is an electronic device, such as a smart phone, a smart watch, a tablet computer, a laptop computer, or the like, that includes a second electronic processor 200 (for example, a microprocessor, application-specific integrated circuit (ASIC), or another suitable electronic device), a second memory 205 (for example, a non-transitory, computer-readable storage medium), a second communication interface 210 such as a transceiver, for communicating over the communication networks 115 and, optionally, one or more additional communication networks or connections, a second camera 215, a second display device 220, and an input device 225. The second display device 220 may be, for example, a touchscreen, a liquid crystal display ("LCD"), a light-emitting diode ("LED") display, an organic LED ("OLED") display, an electroluminescent display ("ELD"), and the like. The input device 225 may be, for example, a keypad, a mouse, a touchscreen (for example, as part of the second display device 220), a microphone, a camera, or the like. The second electronic processor 200, the second memory 205, second camera 215, second display device 220, second communication interface 210, and input device 225 communicate over one or more communication lines or buses. It should be understood that the remote device 110 may include additional components than those illustrated in FIG. 2 in various configurations and may perform additional functionality than the functionality described in the present application. For example, the remote device 110 may include more input devices than the single input device 225. The remote device 110 may also include fewer components than those illustrated in FIG. 2. For example, although illustrated in FIG. 2 as including a camera, the remote device 110 may be an electronic device including an application, such as a map application or a security application that allows the second electronic processor 200 access to images from a remote camera rather than a camera local to the remote device 110.

Figure 3:
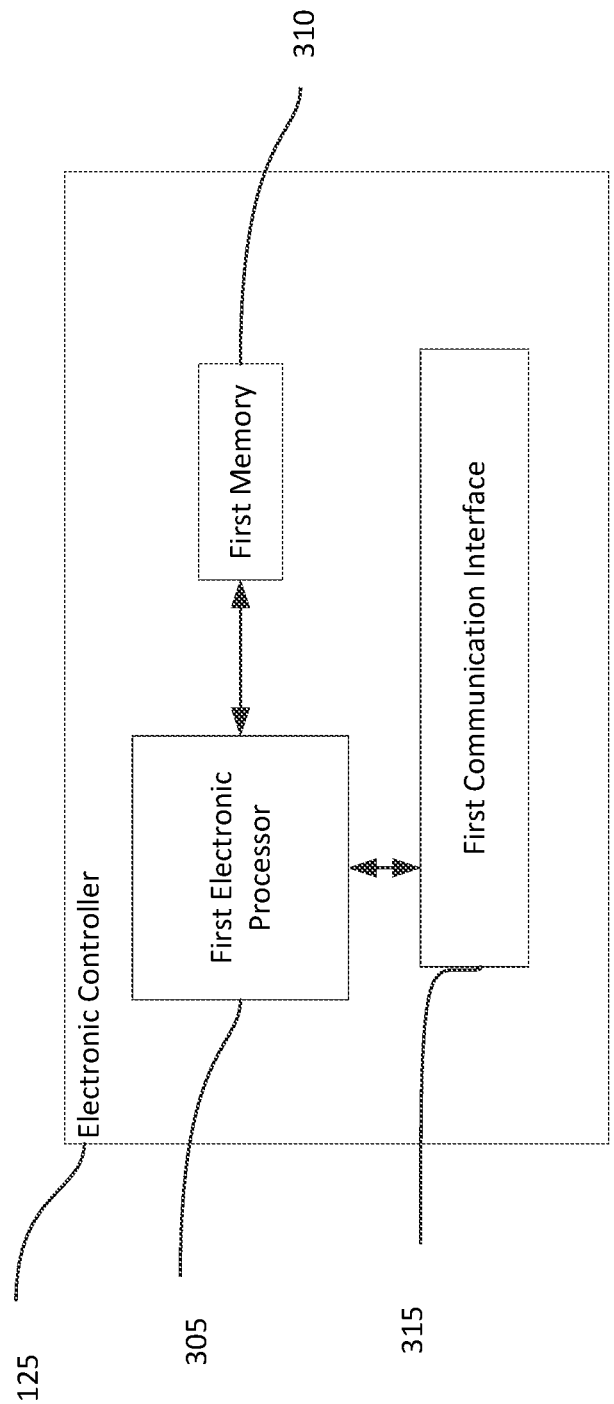
FIG. 3 is a block diagram of an electronic controller of the system of FIG. 1 according to one embodiment.

FIG. 3 is a block diagram of the electronic controller 125 of the systems of FIG. 1. The electronic controller 125 includes a plurality of electrical and electronic components that provide power, operation control, and protection to the components and modules within the electronic controller 125. The electronic controller 125 includes, among other things, a first electronic processor 305 (such as a programmable electronic microprocessor, microcontroller, or similar device), a first memory 310 (for example, non-transitory, machine readable memory), and a first communication interface 315. The first electronic processor 305 is communicatively connected to the first memory 310 and the first communication interface 315. The first electronic processor 305, in coordination with the first memory 310 and the first communication interface 315, is configured to implement, among other things, the methods described herein.

The electronic controller 125 may be implemented in several independent controllers (for example, programmable electronic controllers) each configured to perform specific functions or sub-functions. Additionally, the electronic controller 125 may contain sub-modules that include additional electronic processors, memory, or application specific integrated circuits (ASICs) for handling communication functions, processing of signals, and application of the methods listed below. In other embodiments, the electronic controller 125 includes additional, fewer, or different components.

Figure 4:
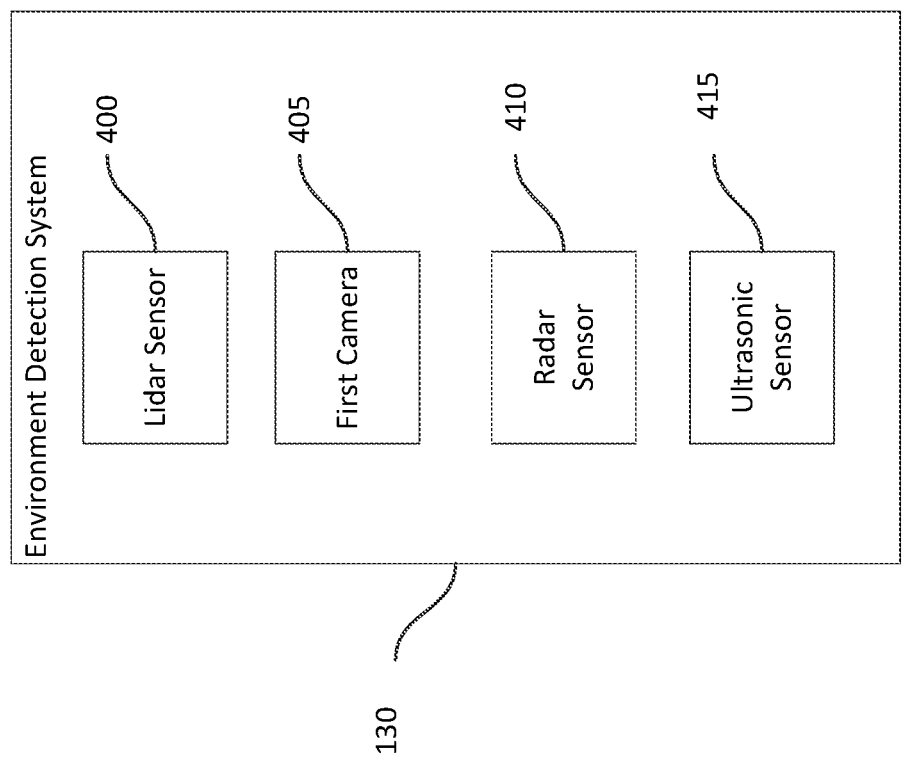
FIG. 4 is a block diagram of an environment detection system of the system of FIG. 1 according to one embodiment.

FIG. 4 is a block diagram of the environment detection system 130 of the vehicle 105. Among other things, the environment detection system 130 includes one or more electromagnetic radiation sensors. Examples of such sensors include a lidar sensor 400, a first camera 405, and a radar sensor 410. The environment detection system 130 may also include a mechanical wave sensor, for example, an ultrasonic sensor 415 in addition to the electromagnetic radiation sensors. In one embodiment the vehicle's environment is detected using only one sensor, for example, the first camera 405. In other embodiments, the environment detection system 130 uses multiple sensors, such as the lidar sensor 400, radar sensor 410, or ultrasonic sensor 415, in combination with the first camera 405. There may be more than one of each of the sensors and they may be located at different positions on the interior or exterior of the vehicle 105. For example, the first camera 405, or components thereof, may be externally mounted to a portion of the vehicle 105 (such as on a side mirror or a trunk door). Alternatively the first camera 405, or components thereof, may be internally mounted within the vehicle 105 (for example, positioned by the rearview mirror). It should be noted that the first camera 405 (and any other camera included in the environment detection system 130) is calibrated so that the location and orientation of the first camera 405 with respect to the vehicle 105 are known. The lens parameters of the first camera 405 are also known. The sensors of the environment detection system 130 are configured to receive signals indicative of the vehicle's distance from and position relative to, elements in the vehicle's surrounding environment as the vehicle 105 moves from one point to another.

Figure 5:
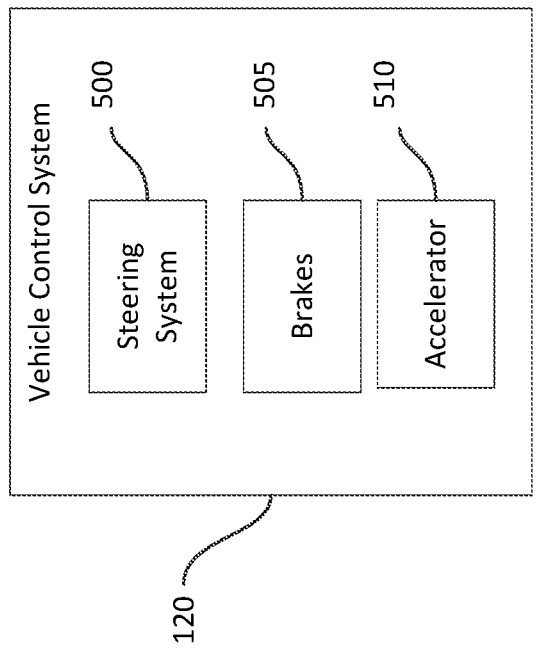
FIG. 5 is a block diagram of a vehicle control system included in a vehicle of the system of FIG. 1 according to one embodiment.

FIG. 5 illustrates an example of the vehicle control system 120. The vehicle control system 120 includes components involved in the autonomous or manual control of the vehicle 105. For example, in some embodiments, the vehicle control system 120 includes a steering system 500, brakes 505, and an accelerator 510. The embodiment illustrated in FIG. 5 provides but one example of the components of the vehicle control system 120. In other embodiments, the vehicle control system 120 includes additional, fewer, or different components.

Figure 6:
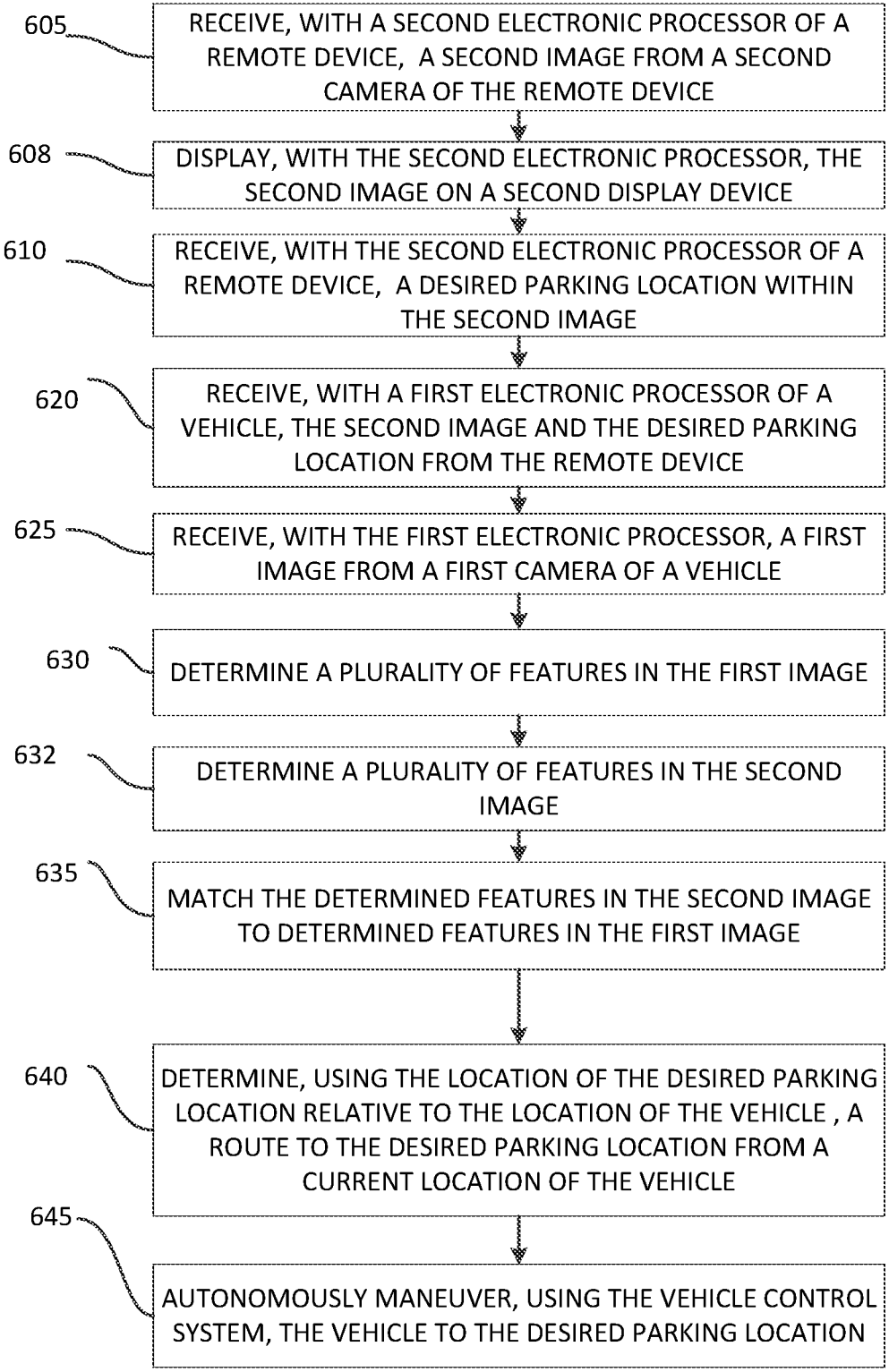
FIG. 6 is a flowchart of a method of using the system of FIG. 1 to autonomously control a vehicle to move to a desired parking location selected via a remote device according to one embodiment.

FIG. 6 illustrates an example method 600 of autonomously controlling a vehicle to move to a desired parking location selected via a remote device. While a particular order of steps is indicated in FIG. 6 as an example, the timing, sequence, and inclusion of steps may vary where appropriate without negating the purpose and advantages of the examples set forth in detail herein.

In some embodiments, at step 605 the remote device 110 receives a second image from the second camera 215. In other embodiments, the second electronic processor 200 receives the second image via, for example, an application that retrieves the image from a remote storage location such as a server or a camera remote to the remote device 110. The application may be, for example, a map application or a security application. At step 608, the second electronic processor 200 displays the second image on the second display device 220. At step 610, the second electronic processor 200 receives a desired parking location within the second image, via the input device 225 of the remote device 110. For example, the second electronic processor 200 receives the desired parking location when a user selects a location in the second image by dragging a shape representative of the vehicle 105 to a desired parking location in the second image.

Figure 7:
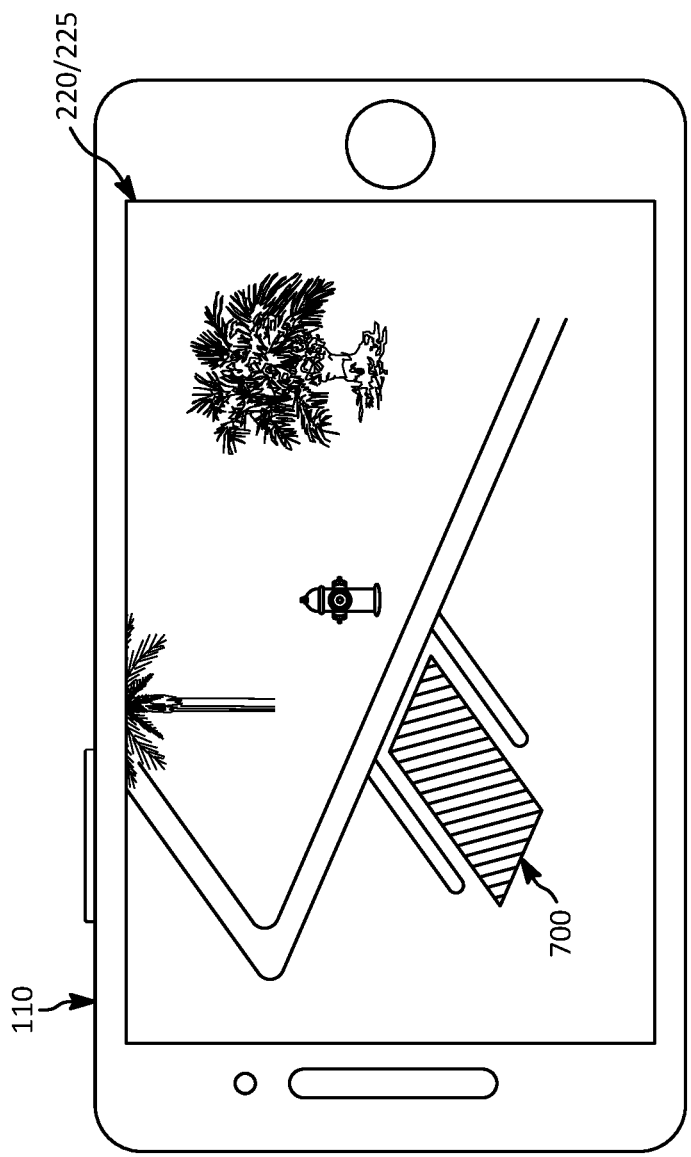
FIG. 7 is an illustrative example of a user selecting a desired parking location via the remote device.

FIG. 7 provides an example of a user selecting a desired parking location via the remote device 110. In the example illustrated in FIG. 7, the remote device 110 is illustrated as a smart telephone. On a screen (the second display device 220) of the smart telephone the second image is displayed. Overlaid on the second image is a rectangular shape 700. The location of the shape 700 in the second image is illustrative of the desired parking location and the size of the shape 700 is the area occupied by the vehicle 105 in the desired parking location. The user may be able to change the location of the shape 700 in the second image and the size of the shape 700, via the input device 225. For example, in FIG. 7, the screen may be a touch screen and the user may be able to select the shape 700 by touching the shape 700 and move the shape 700 to a different position in the second image by dragging the shape 700 to a new position on the screen. The second electronic processor 200 may receive confirmation that the shape 700 is in the desired location from the input device 225. For example, the input device 225 may send a confirmation signal to the second electronic processor 200 when the user presses a button (the input device 225) included in the remote device 110.

At step 625, the first electronic processor 305 receives a first image from the first camera 405 and at step 630 the first electronic processor 305 determines plurality of features in the first image. The first electronic processor 305 analyzes the first image to determine one or more regions in the image that include a "strong" feature. The strong feature may be, for example, a corner or a line, such as a line marking a parking space, a curb edge, a tree branch, and the like. The first electronic processor 305 then analyzes pixels within the determined regions of the image including the strong feature to produce a feature descriptor for that strong feature. Generally speaking, the feature descriptors are scale and orientation invariant. It should be noted that when features are described herein as being matched, it is the feature descriptors that are matched. At step 632 the second electronic processor 200 determines a plurality of features descriptors in the second image in a similar manner to that described above with respect to the first image. In some embodiments, at step 620 the first electronic processor 305 receives, via the first communication interface 315, the second image and desired parking location from the remote device 110. In other embodiments, the first electronic processor 305, rather than the second electronic processor 200, determines the plurality of feature descriptors in the second image and the first electronic processor 305 receives the second image, the desired parking location, and the plurality of feature descriptors in the second image.

In some embodiments, the remote device 110 includes, for example, a GPS (global positioning system) receiver and the first electronic processor 305 receives a location of the remote device 110. Likewise, the vehicle 105 may include a GPS receiver and the first electronic processor 305 may compare the location of the remote device 110 when the second image is captured to the location of the vehicle 105. If the location of the remote device 110 when the second image is captured and the location of the vehicle 105 are not approximately the same, the first electronic processor 305 uses the vehicle control system 120 to autonomously move the vehicle 105 close to the location of the remote device 110 when the second image is captured, provides instructions to the driver of the vehicle 105, via, for example, the first display device 135 or a speaker included in the vehicle 105, instructing the driver to move the vehicle 105 to a location closer to the location of the remote device 110 when the second image is captured, or a combination thereof. In some embodiments, the first electronic processor 305 receives the first image once the current location of the vehicle 105 is close to the received location of the remote device 110. A location close to the remote device 110 when the second image is captured may be, for example, a location that is at most a threshold distance (such as ten meters) from the location of the remote device 110 when the second image is captured.

At step 635, the first electronic processor 305 matches the determined features in the second image to the determined features in the first image. The lens parameters of the first camera 405 as well as the position and orientation of the first camera 405 on the vehicle 105 are taken into account during the feature matching. In some embodiments, the first electronic processor 305 utilizes feature matching algorithms to match features in the first image and the second image. One example of a feature matching algorithm is the scale invariant feature transform (SIFT) method, which is capable of identifying matching features within the images captured by the second camera 215 and the first camera 405 despite differences in a pose of the first camera 405 compared to a pose the second camera 215, a scale of the first image compared to a scale of the second image, a lens characteristic of the first camera 405 compared to a lens characteristic of the second camera 215, and lighting of the first image compared to lighting of the second image. Other examples of feature matching algorithms include a rotation invariant feature transform (RIFT) method, a Gradient Location and Orientation Histogram (GLOH) method, a Speeded Up Robust Features (SURF), Monte-Carlo localization (MCL) method, a Local Bundle Adjustment (LBA) method, and a simultaneous localization and mapping (SLAM) method. It should be noted that a combination of the above listed feature matching algorithms may be used to match features in the first image with features in the second image. Additionally, it should be understood that feature matching algorithms other than those described above may be used to match features in the first image with features in the second image.

It should be noted that in some embodiments, the first camera 405, second camera 215, or both capture a plurality of images or a video. Increasing the number of images of the desired parking location used in the feature matching algorithm increases the accuracy of the feature matching algorithm. Additionally, the accuracy of the matching algorithm may increase as the number of times the method 600 is performed and feedback is received from the user increases.

In some embodiments, it is required that a predetermined number of matched features be determined before the matching is completed. In some embodiments, when the first electronic processor 305 matches less than a predetermined number of features in the first image to features in the second image, the first electronic processor 305 sends the first image to the remote device 110. The second electronic processor 200 displays the received first image via the second display device 220 and prompts a user to select a desired parking location in the first image via the input device 225. When the second electronic processor 200 receives a selection of a desired parking location in the first image, the second electronic processor 200 sends the first image with the desired parking location to the first electronic processor 305. The first electronic processor 305 utilizes the vehicle control system 120 and the environment detection system 130 to autonomously maneuver the vehicle 105 to the desired parking location based on the plurality of features determined in the first image. The predetermined number of features may be, for example, the number of features required to determine the position of the vehicle 105 relative to the desired parking location. At step 640 the first electronic processor 305 uses the location of the desired parking location relative to the location of the vehicle 105, to determine a route to the desired parking location from a current location of the vehicle 105. At step 645 the first electronic processor 305 sends instructions to the vehicle control system 120 to autonomously maneuver the vehicle 105 to the desired parking location.

Figure 8:
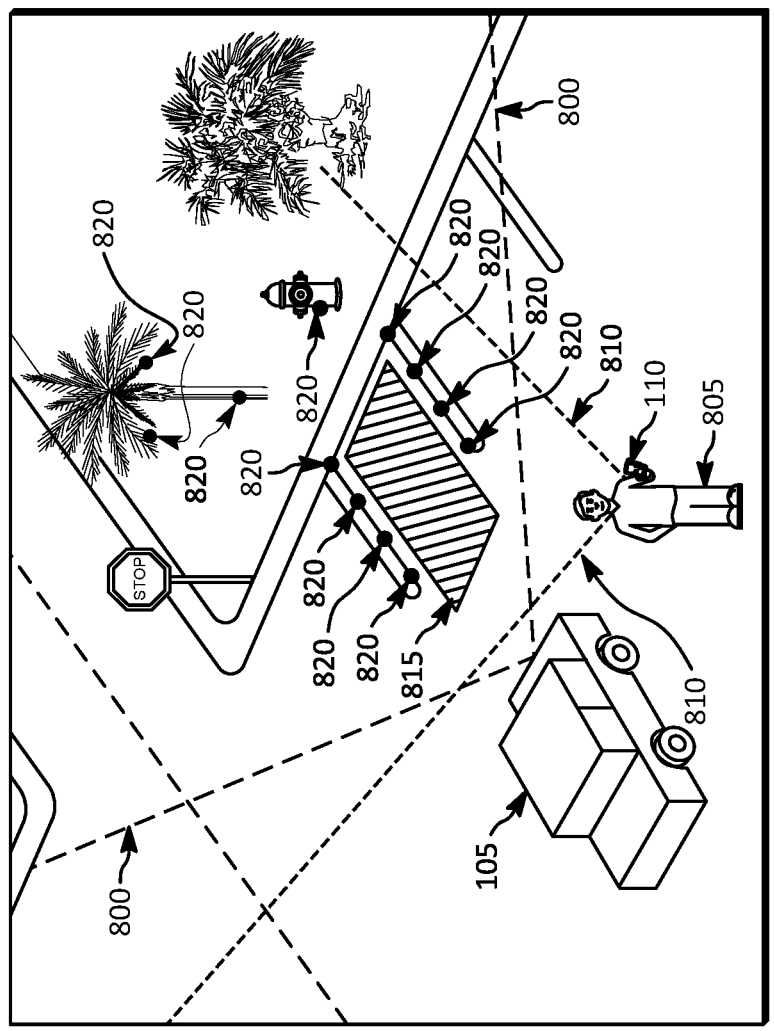
FIG. 8 is an illustrative example of the system of FIG. 1 performing the method of FIG. 6.

FIG. 8 illustrates an example of the system 100 performing the method 600. In the illustrated example of FIG. 8 the first camera 405 is located at the rear of the vehicle 105 and the first set of dashed lines 800 illustrate the field of view of the first camera 405. The second camera 215 is included in the remote device 110 held by a user 805 and the second set of dashed lines 810 illustrate the field of view of the second camera 215. The desired parking location is illustrated as the rectangle 815. And the markers 820 illustrate features in the first image and the second image matched by the first electronic processor 305.

In some embodiments, the first display device 135 of the vehicle 105 may display an image from the first camera 405 as the vehicle 105 moves to the desired parking location. In some embodiments, the image displayed on the first display device 135 of the vehicle 105 may have the desired parking location overlaid on it, the path of the vehicle 105 to the desired location overlaid on it, or both.

Figure 9:
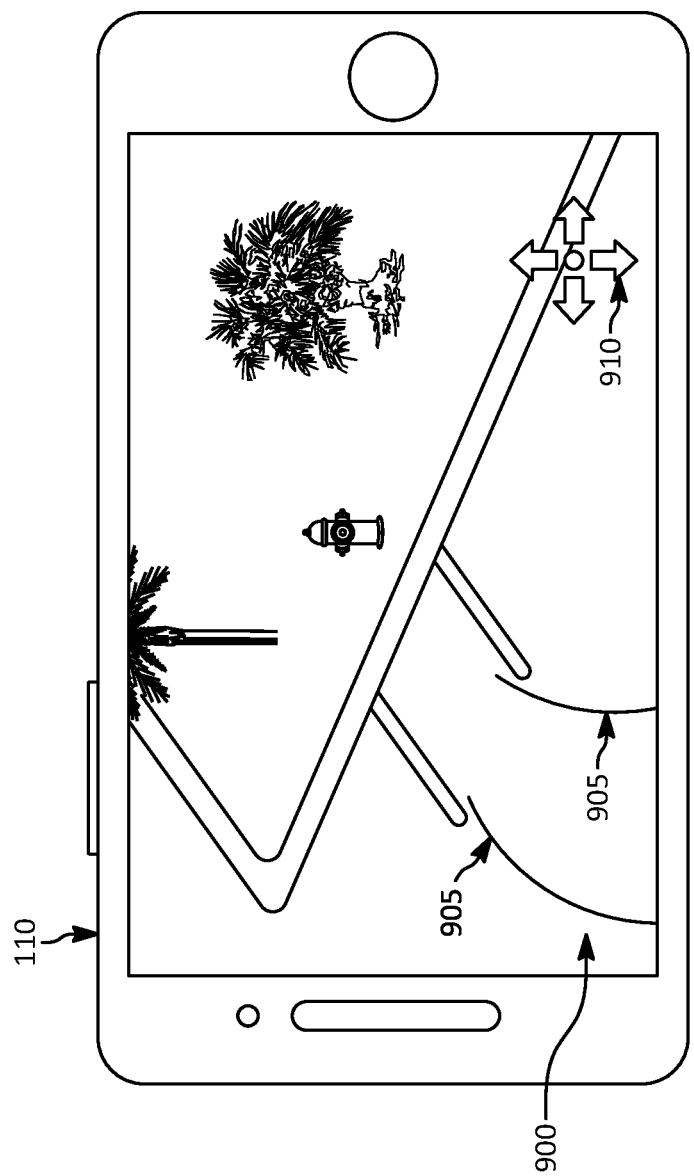
FIG. 9 is an illustrative example of the remote device of FIG. 2 displaying an image including a determined route received from a vehicle of the system of FIG. 1.

In some embodiments, the first electronic processor 305 may send an image showing the determined route for the vehicle 105 to travel to the desired parking location to the remote device 110. FIG. 9 illustrates an example of the remote device 110 (illustrated in FIG. 9 as a cellular device) displaying, via the second display device 220 (illustrated as the screen of the cellular device), an image 900 from the first electronic processor 305. In FIG. 9 a graphical representation 905 of the determined route to the desired parking location is overlaid on the image 900. In some embodiments, the second electronic processor 200 may receive a confirmation of the determined route, or a selection of a different route from the input device 225. In one example, when a user does not approve of the determined route the user may move the graphical representation 905 on the display device 220 via the input device 225 of the remote device 110 (the controls 910 displayed on the screen of the cellular device) to alter the determined route and create a different route. The remote device 110 may send the different route to the vehicle 105 via the communication network 115 and the vehicle 105 may take the different route rather than the determined route to the desired parking location. In another example, when the user approves of the determined route, the user may indicate their approval of the determined route via the input device 225. For example, the user may press a button included in the remote device 110 when the user approves of the route. The input device 225 may send a confirmation signal to the second electronic processor 200 and the remote device 110 may send the signal from the remote device 110 to the vehicle 105. Upon receiving the confirmation signal from the remote device 110, the first electronic processor 305 uses the vehicle control system 120 to autonomously maneuver the vehicle 105 to the desired parking location via the determined route.

In some embodiments, when the first electronic processor 305 receives a signal from the environment detection system 130 that an obstruction or obstacle has been detected along the determined route, the first electronic processor 305 determines a different route for the vehicle 105 to take to the desired parking location, sends a notification to the remote device 110, or both. In some embodiments, the first electronic processor 305 determines if the desired parking location is large enough to park the vehicle 105. For example, the first electronic processor 305 may receive one or more signals from an ultrasonic sensor 415 of the environment detection system 130 that allow the first electronic processor 305 to determine that the desired parking location is between a wall and another vehicle and there is not enough space between the wall and the other vehicle for the vehicle 105 to be parked between them. When the first electronic processor 305 determines the desired parking location is not large enough to park the vehicle 105, the first electronic processor 305 may send a signal to the remote device 110 to notify the user that the desired parking location is not large enough to park the vehicle 105.

Figure 10:
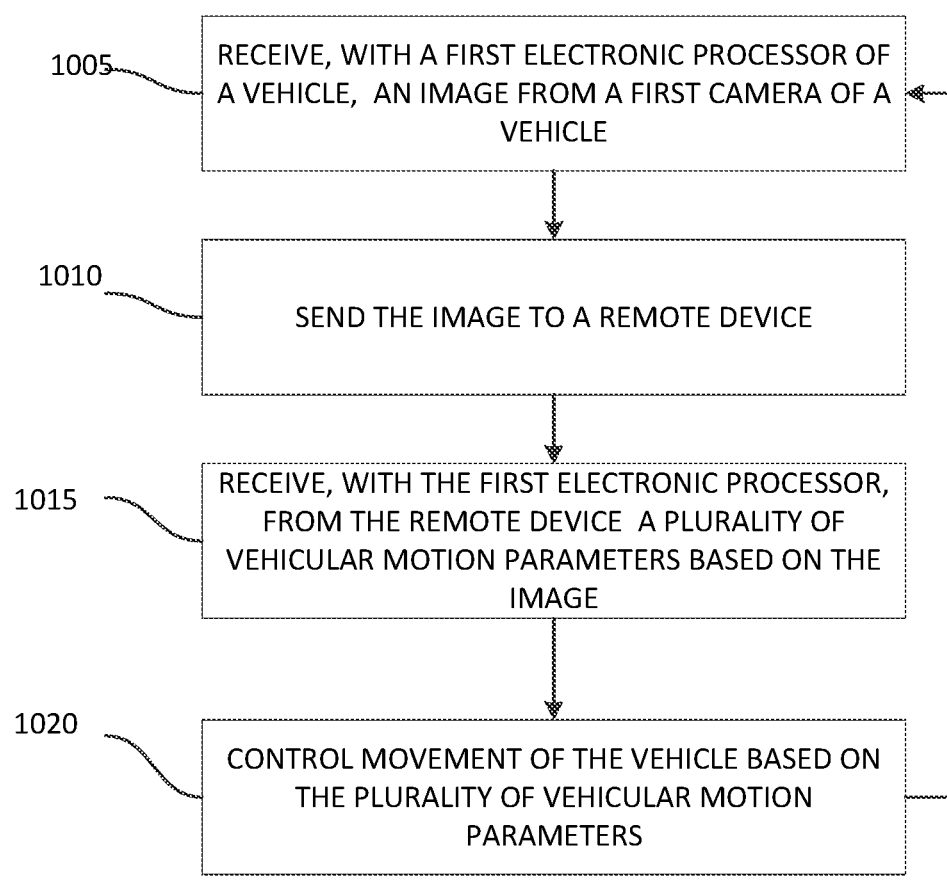
FIG. 10 is a flowchart of a method of controlling motion of a vehicle using a mobile computing device.
Figure 11:
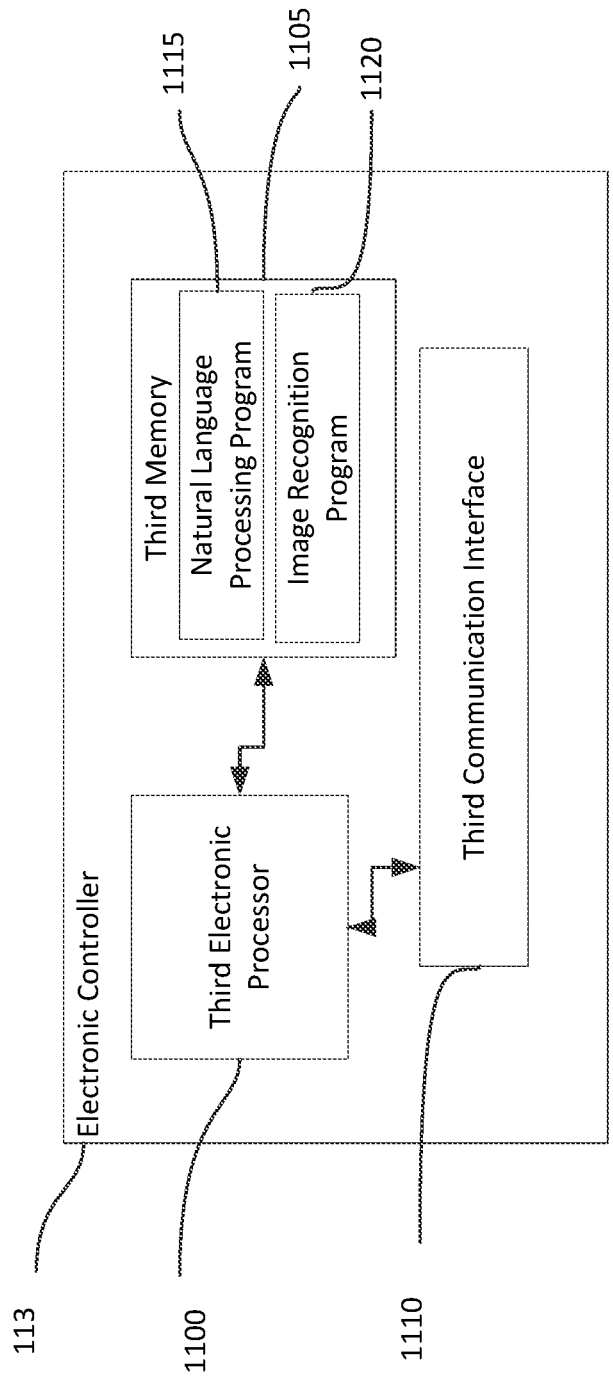
FIG. 11 is a block diagram of an electronic computing device of the system of FIG. 1 according to one embodiment.

FIG. 10 illustrates an example method 1000 for controlling motion of a vehicle using a mobile computing device. The method 1000 may be implemented using the system 100 described above. In the method 1000 the remote device 110 may be a mobile computing device such as a smart phone. The method 1000 begins at step 1005 when the first electronic processor 305 receives an image of the surrounding environment of the vehicle 105 from the first camera 405. At step 1010 the first electronic processor 305 sends the image to the remote device 110. The second electronic processor 200 displays the image via the display device 220. It should be noted that, in some embodiments, the second electronic processor 200 receives and displays on the display device 220 a video feed from the first camera 405. The second electronic processor 200 receives, from the input device 225, input based on the image that indicates a plurality of vehicular motion parameters. The plurality of vehicular motion parameters may include, for example, a distance, a speed, and a direction. In one example, a user may select an area of the image to indicate the direction they want the vehicle to move in and a speed from a list of available speeds. At step 1015 the first electronic processor 305 receives the plurality of vehicular motion parameters from the remote device 110. At step 1020 the first electronic processor 305 the uses the vehicle control system 120 to control the movement of the vehicle 105 based on the plurality of vehicular motion parameters. In some embodiments, steps 1005 through 1020 are repeated until the first electronic processor 305 receives a signal from the remote device 110 indicating that the vehicle is to park in its current location and shut or power off. It should be understood that, in some embodiments, a user may select an area of the image as a desired parking space rather than a plurality of vehicular motion parameters and the first electronic processor 305 uses the vehicle control system 120 to move the vehicle 105 based on the selected area in the image (the desired parking space). Additionally, in some embodiments, when the first electronic processor 305 is executing steps 1015 and 1020 of the method 1000 and receives a signal from the environment detection system 130 that an obstruction or obstacle has been detected in the path of the vehicle 105, the first electronic processor 305 uses the vehicle control system 120 to avoid the detected obstruction, sends a notification to the remote device 110, or both. As illustrated in FIG. 11, the electronic computing device 113 includes an electronic processor 1100 (for example, a microprocessor, application-specific integrated circuit (ASIC), or another suitable electronic device), a memory 1105 (a non-transitory, computer-readable storage medium), and a communication interface 1110, such as a transceiver, for communicating over the communication networks 115 and, optionally, one or more additional communication networks or connections. The electronic processor 1100, the memory 1105, and the communication interface 1110 communicate wirelessly, over one or more communication lines or buses, or a combination thereof. It should be understood that the electronic computing device 113 may include additional components than those illustrated in FIG. 11 in various configurations and may perform additional functionality than the functionality described in the present application. Also, the functionality described herein as being performed by the electronic computing device 113 may be distributed among multiple devices within the system 100.

The electronic computing device 113 may include computer executable instructions or programs in the third memory 1105. For example, the memory 1105 may include a natural language processing program 1115 and an image recognition program 1120.

FIG. 12 illustrates an example method 1200 of specifying a desired parking location for a vehicle using a verbal description, for example, an oral description captured via a microphone and converted to text in a voice-to-text processing program. The method 1200 begins at step 1205 when the first electronic processor 305 or the second electronic processor 200 receives a verbal description of a desired parking location in a parking area (a parking area is, for example, a street address of a desired parking location). At step 1210, the first electronic processor 305 or the second electronic processor 200 transmits the verbal description of the desired parking location to the electronic computing device 113. At step 1215, the third electronic processor 1100 of the electronic computing device 113 executes the natural language processing program 1115 to analyze the verbal description of a desired parking location. At step 1220, the third electronic processor 1100 relates the verbal description of the desired parking location to an object in the parking area. For example, the third electronic processor 1100 may determine that the desired parking location is "behind the truck," "on the driveway," or "on the grass to the left of the tree".

At step 1225, when a vehicle (for example, the vehicle 105) arrives at the parking area, the camera included in the vehicle (for example, the second camera 215) captures one or more images of the parking area and the electronic controller 125 sends the one or more images of the general location to the electronic computing device 113. At step 1230, the third electronic processor 1100 executes an image recognition program 1120 to apply computer vision processing techniques such as object recognition and localization or semantic segmentation, to the one or more images of the parking area to identify the objects and regions in the one or more images of the general location. In some embodiments, sensors included in the environment detection system 130 (for example, the lidar sensor 400, radar sensor 410, ultrasonic sensor 415, or a combination of the foregoing) also provide object location information to the electronic computing device 113 to assist the third electronic processor 1100 in detecting objects in the one or more images of the parking area. At step 1235, using the relational information determined from the verbal description and the objects identified in the one or more images of the parking area, the third electronic processor 1100 identifies the desired parking location in the parking area. The electronic computing device 113 sends, to the vehicle 105, an indication of the desired parking location in the one or more images of the parking area. At step 1240, the first electronic processor 305 sends instructions to the vehicle control system 120 to autonomously maneuver the vehicle 105 to the desired parking location.

Thus, the embodiments described herein provide, among other things, a system and a method for autonomously controlling a vehicle to move to a parking location selected via a remote device. Various features and advantages of the embodiments are set forth in the following claims.

What is claimed is:

1. A vehicle for autonomously parking in a desired parking location selected via a remote device, the vehicle comprising:
    a first camera;
    a vehicle control system; and
    a first electronic processor configured to
        receive a first image from the first camera;
        determine a plurality of features in the first image;
        receive, from the remote device, a second image and the desired parking location in the second image;
        determine a plurality of features in the second image;
        match the determined features in the second image to determined features in the first image;
        determine a location of the vehicle relative to the desired parking location using the matched features;
        determine, using the location of the desired parking location relative to the location of the vehicle, a route to the desired parking location from a current location of the vehicle; and
        autonomously maneuver, using the vehicle control system, the vehicle to the desired parking location.

2. The vehicle according to claim 1, wherein the first electronic processor is further configured to display the desired parking location via a first display device included in the vehicle.

3. The vehicle according to claim 1, wherein the first electronic processor is further configured to determine a different route to the desired parking location when an obstacle is detected on the route to the desired parking location.

4. The vehicle according to claim 1, wherein the first electronic processor is further configured to:
    compare the received location of the remote device to the current location of the vehicle; and
    when the location of the remote device and the current location of the vehicle are not approximately the same, move the vehicle to a location that is approximately the same as the location of the remote device, provide instructions to a driver of the vehicle to move the vehicle a location that is approximately the same as the location of the remote device, or both.

5. The vehicle according to claim 1, wherein the vehicle is communicatively coupled to the remote device and the remote device includes
    a second camera;
    a second display device; and
    a second electronic processor configured to
        receive the second image from the second camera;
        display the second image on the second display device; and
        receive a selection of the desired parking location in the second image.

6. The vehicle according to claim 5, wherein the second electronic processor is further configured to
    display an image including the determined route, wherein the determined route is represented as a graphical object overlaid on the image; and
    receive a selection of a different route, when the graphical object is moved on the second display device, via an input device of the remote device.

7. The vehicle according to claim 1, wherein the first electronic processor is further configured to
    send an image including the determined route to the remote device; and
    when confirmation of the determined route is received from the remote device, autonomously maneuver the vehicle to the desired parking location, via the determined route; and
    when a different route is received from the remote device, autonomously maneuver the vehicle to the desired parking location, via the different route.

8. The vehicle according to claim 1, wherein the remote device receives the second image from one of the group consisting of a camera associated with a map application and a camera associated with a security application.

9. The vehicle according to claim 1, the first electronic processor further configured to
    when less than a predetermined number of features in the first image are matched to features in the second image, send the first image to the remote device;
    receive from the remote device a selection of a desired parking location in the first image;
    autonomously maneuver the vehicle to the desired parking location in the first image.

10. A method of autonomously controlling a vehicle to move to a desired parking location selected via a remote device, the method comprising:
- receiving, with a first electronic processor, a first image from a first camera included in the vehicle;
- determining, with the first electronic processor, a plurality of features in the first image;
- receiving, from the remote device, a second image and the desired parking location in the second image;
- determining, with the first electronic processor, a plurality of features in the second image;
- matching, with the first electronic processor, the determined features in the second image to determined features in the first image;
- determining, with the first electronic processor, a location of the desired parking location relative to the vehicle using the matched features;
- determining, with the first electronic processor, using the location of the desired parking location relative to the vehicle, a route to the desired parking location from a current location of the vehicle; and
- autonomously maneuvering, with a vehicle control system, the vehicle to the desired parking location.

11. The method according to claim 10, the method further comprising displaying the desired parking location via a first display device included in the vehicle.

12. The method according to claim 10, the method further comprising determining a different route to the desired parking location when an obstacle is detected on the route to the desired parking location.

13. The method according to claim 10, the method further comprising
- comparing the received location of the remote device to the current location of the vehicle; and
- when the location of the remote device and the current location of the vehicle are not approximately the same, moving the vehicle to a location that is approximately the same as the location of the remote device, providing instructions to a driver of the vehicle to move the vehicle a location that is approximately the same as the location of the remote device, or both.

14. The method according to claim 10, the method further comprising
- receiving, with a second electronic processor included in the remote device, the second image from a second camera;
- displaying, with the second electronic processor, the second image on a second display device; and
- receiving, with the second electronic processor, a selection of the desired parking location in the second image.

15. The method according to claim 14, the method further comprising
- displaying, on the second display device, an image including the determined route, wherein the determined route is represented as a graphical object overlaid on the image; and
- receiving, with the first electronic processor, a selection of a different route, when the graphical object is moved on the second display device, via an input device of the remote device.

16. The method according to claim 10, the method further comprising
- sending an image including the determined route to the remote device; and
- when confirmation of the determined route is received from the remote device, autonomously maneuvering the vehicle to the desired parking location, via the determined route; and
- when a different route is received from the remote device, autonomously maneuvering the vehicle to the desired parking location, via the different route.

17. The method according to claim 10, wherein the remote device receives the second image from one of the group consisting of a camera associated with a map application and a camera associated with a security application.

18. The method according to claim 10, the method further comprising
- when less than a predetermined number of features in the first image are matched to features in the second image, sending the first image to the remote device;
- receiving from the remote device a selection of a desired parking location in the first image;
- autonomously maneuvering the vehicle to the desired parking location in the first image.

19. A method of controlling motion of a vehicle using a remote device, the method comprising:
- receiving, with a first electronic processor of the vehicle, an image from a first camera of the vehicle;
- sending the image to the remote device;
- receiving, with the first electronic processor, from the remote device a selection of an area of the image as a desired parking location;
- maneuvering, via the first electronic processor, the vehicle to the desired parking location; and
- when an obstruction is detected in a path the vehicle is taking to the desired parking location, maneuvering, with the first electronic processor, the vehicle to avoid the detected obstruction, sending a notification to the remote device, or both.

20. A method of specifying a desired parking location for a vehicle using a verbal description, the method comprising:
- receiving, with a first electronic processor or a second electronic processor, the verbal description of the desired parking location in a parking area;
- transmitting, the verbal description of the desired parking location to an electronic computing device;
- analyzing, with a third electronic processor of the electronic computing device, the verbal description of a desired parking location;
- relating, with the third electronic processor, the verbal description of the desired parking location to an object in the parking area;
- when the vehicle arrives at the parking area, capturing one or more images of the parking area with a camera of the vehicle;
- applying, with the third electronic processor, computer vision processing techniques to the one or more images of the parking area to identify objects and regions in the one or more images of the general location;
- using the relational information determined from the verbal description and the objects identified in the one or more images of the parking area, identifying, with the third electronic processor, the desired parking location in the parking area; and
- sending, with the first electronic processor, instructions to a vehicle control system to autonomously maneuver the vehicle to the desired parking location.

* * * * *